(12) United States Patent
Burstein et al.

(10) Patent No.: US 11,870,590 B2
(45) Date of Patent: Jan. 9, 2024

(54) SELECTIVE RETRANSMISSION OF PACKETS

(71) Applicant: MELLANOX TECHNOLOGIES, LTD., Yokneam (IL)

(72) Inventors: Idan Burstein, Carmiel (IL); Roee Moyal, Yokneam Illit (IL); Ariel Shahar, Jerusalem (IL); Noam Bloch, Bat Shlomo (IL); Ran Koren, Beijing (CN)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 60 days.

(21) Appl. No.: 17/107,990

(22) Filed: Dec. 1, 2020

(65) Prior Publication Data
US 2022/0158772 A1    May 19, 2022

(30) Foreign Application Priority Data
Nov. 19, 2020  (CN) .......................... 202011302227.3

(51) Int. Cl.
*H04L 1/18* (2023.01)
*H04L 1/1829* (2023.01)
*G06F 15/173* (2006.01)

(52) U.S. Cl.
CPC ...... *H04L 1/1829* (2013.01); *G06F 15/17331* (2013.01)

(58) Field of Classification Search
CPC .......................... H04L 1/1829; G06F 15/17331
See application file for complete search history.

(56) References Cited

U.S. PATENT DOCUMENTS 6,333,929 B1 * 12/2001 Drottar ................ H04L 67/561
                                                          370/362
9,197,428 B1    11/2015 Lebedev et al.
(Continued)

FOREIGN PATENT DOCUMENTS

CN        103546258 A       1/2014
CN        110460412 A       11/2019
(Continued)

OTHER PUBLICATIONS

InfiniBandTM Architecture Specification vol. 1, Release 1.3, 1842 pages, Mar. 3, 2015.
(Continued)

*Primary Examiner* — David P Zarka
*Assistant Examiner* — Wuji Chen
(74) *Attorney, Agent, or Firm* — KLIGLER & ASSOCIATES PATENT ATTORNEYS LTD

(57) ABSTRACT

A method for data transfer includes transmitting a sequence of data packets from a first computer over a network to a second computer in a single RDMA data transfer transaction. Upon receipt of a second packet in the sequence without previously having received the first packet, the second computer sends a NAK packet over the network to the first computer, indicating that the first packet was not received. A retransmission mode is selected responsively to the type of the transaction, such that when the transaction is of a first type, the first packet is retransmitted from the first computer to the second computer in response to the NAK packet without retransmitting the second packet, and when the transaction is of a second type, both the first and second packets are retransmitted from the first computer to the second computer in response to the NAK packet.

18 Claims, 6 Drawing Sheets

(56) References Cited

U.S. PATENT DOCUMENTS

| | | | |
|---|---|---|---|
| 9,692,560 B1* | 6/2017 | Galon | H04L 1/1628 |
| 10,430,374 B2* | 10/2019 | Menachem | G06F 13/28 |
| 10,785,306 B1* | 9/2020 | Li | H04L 69/329 |
| 2005/0149817 A1 | 7/2005 | Biran et al. | |
| 2006/0133554 A1 | 6/2006 | Horn | |
| 2006/0274748 A1 | 12/2006 | Nakashima et al. | |
| 2008/0225842 A1 | 9/2008 | Goldfein et al. | |
| 2010/0231352 A1 | 9/2010 | Bolton et al. | |
| 2011/0078291 A1 | 3/2011 | Bickson et al. | |
| 2012/0093136 A1 | 4/2012 | Julian et al. | |
| 2012/0240000 A1 | 9/2012 | Venkataraj | |
| 2012/0314648 A1 | 12/2012 | Zhang et al. | |
| 2013/0024578 A1 | 1/2013 | Lida et al. | |
| 2013/0031215 A1 | 1/2013 | Macrae et al. | |
| 2013/0230051 A1 | 9/2013 | Lockwood | |
| 2014/0040616 A1 | 2/2014 | Barber et al. | |
| 2014/0254598 A1 | 9/2014 | Jha et al. | |
| 2014/0269360 A1 | 9/2014 | Jafarian et al. | |
| 2014/0334375 A1 | 11/2014 | Sugitani | |
| 2015/0046533 A1 | 2/2015 | Talloen | |
| 2015/0085720 A1 | 3/2015 | Gaal et al. | |
| 2015/0103822 A1 | 4/2015 | Gianchandani et al. | |
| 2015/0117201 A1 | 4/2015 | Cousins | |
| 2015/0121161 A1 | 4/2015 | Cousins | |
| 2015/0146607 A1 | 5/2015 | Abraham et al. | |
| 2015/0172226 A1* | 6/2015 | Borshteen | H04L 49/9057 370/412 |
| 2015/0222444 A1 | 8/2015 | Sarkar | |
| 2015/0293881 A1* | 10/2015 | Raikin | G06F 12/1072 709/212 |
| 2015/0295692 A1 | 10/2015 | Gowda et al. | |
| 2015/0381323 A1 | 12/2015 | Ammirata | |
| 2016/0026605 A1* | 1/2016 | Pandit | G06F 15/17331 709/212 |
| 2016/0062442 A1 | 3/2016 | Burstein et al. | |
| 2016/0085704 A1 | 3/2016 | Lida et al. | |
| 2017/0187496 A1* | 6/2017 | Shalev | H04L 45/74 |
| 2017/0187621 A1* | 6/2017 | Shalev | H04L 45/745 |
| 2017/0201343 A1 | 7/2017 | Merlin et al. | |
| 2017/0255559 A1* | 9/2017 | Burstein | G06F 15/17331 |
| 2018/0004705 A1* | 1/2018 | Menachem | H04L 67/1097 |
| 2018/0011763 A1* | 1/2018 | Tanaka | G06F 11/1076 |
| 2018/0191623 A1* | 7/2018 | Marty | H04L 43/0835 |
| 2019/0332314 A1* | 10/2019 | Zhang | G06F 3/0656 |
| 2020/0322466 A1* | 10/2020 | Yang | H04L 67/1097 |
| 2020/0349098 A1* | 11/2020 | Caulfield | G06F 9/505 |
| 2021/0119930 A1* | 4/2021 | Debbage | H04L 1/1642 |
| 2021/0385147 A1* | 12/2021 | Cohen | H04L 47/127 |
| 2022/0014468 A1* | 1/2022 | Wang | H04L 47/34 |
| 2022/0094646 A1* | 3/2022 | Padala | H04L 67/1097 |

FOREIGN PATENT DOCUMENTS

| | | |
|---|---|---|
| CN | 111786748 A | 10/2020 |
| CN | 111917815 A | 11/2020 |
| EP | 1193903 A1 | 4/2002 |
| WO | 0223791 A2 | 3/2002 |

OTHER PUBLICATIONS

Mathis et al., "TCP Selective Acknowledgment Options", Network Working Group, RFC2018, p. 1-12, Oct. 1996.

EP Application # 21208823.1 Search Report dated Apr. 7, 2022.

CN Application # 202011302227.3 Office Action dated Aug. 9, 2023.

* cited by examiner

SELECTIVE RETRANSMISSION OF PACKETS

FIELD OF THE INVENTION

The present invention relates generally to computer systems, and particularly to data exchange over a network among computers by remote direct memory access (RDMA).

BACKGROUND

Some packet transport protocols, such as the Transmission Control Protocol (TCP), use a mechanism of acknowledgment (ACK) and retransmission to ensure that messages are delivered reliably in their entirety. The receiver of packets on a TCP connection sends ACK packets back to the transmitter to indicate which data packets it has received. When the transmitter fails to receive a positive acknowledgment within a certain timeout period, it retransmits the unacknowledged packet or packets.

A selective acknowledgment (SACK) mechanism for TCP was defined by Mathis et al., in "TCP Selective Acknowledgment Options," published as Request for Comments (RFC) 2018 by the Internet Engineering Task Force (IETF), October 1996. According to the authors, with selective acknowledgments, the data receiver can inform the sender about all segments that have arrived successfully, so the sender need retransmit only the segments that have actually been lost.

RDMA protocols enable the network interface controller (NIC) of one computer to read and write data over a network from and to the memory of another computer by transmitting and receiving packets over the network without involving the operating system of either computer in the memory access operations. These RDMA transactions are typically performed in response to work requests submitted to the NIC by application processes running on the host processor, and thus enable applications on different nodes of the network to exchange data efficiently, with high bandwidth and low latency. (The term "transaction" is used in the context of the present description and in the claims to refer to an operation in which a selected range of data is transferred from the memory of one computer to the memory of another computer by transmission of packets over a network between the respective NICs of the computers.) Common RDMA transactions include RDMA Write and Send operations, in which data are transferred from the memory of a requesting computer to the memory of a receiving computer (referred to as the "requester" and the "responder," respectively), and RDMA Read operations, in which the responder transfers data to the requester. In RDMA Write operations, the requester specifies the memory range to which the data are to be written by the responder; whereas in Send operations, the memory range is specified by a work request (known as a work queue element, or "WQE") submitted from the host processor to the NIC of the responder.

A number of RDMA protocols are known in the art, such as the InfiniBand™ (IB) RDMA protocols that are used over IB switch fabrics, and RDMA over Converged Ethernet (RoCE), which is designed to run over Ethernet networks. In RoCE, the IB RDMA layer runs directly over the Ethernet link layer (in RoCE version 1) or over the User Datagram Protocol (UDP) transport layer on Internet Protocol (IP) networks (in RoCE version 2).

U.S. Pat. No. 10,430,374, whose disclosure is incorporated herein by reference, describes a method for data transfer, which includes transmitting a sequence of data packets, including at least a first packet and a second packet transmitted subsequently to the first packet, from a first computer over a network to a second computer in a single remote direct memory access (RDMA) data transfer transaction. Upon receipt of the second packet at the second computer without previously having received the first packet, a negative acknowledgment (NAK) packet is sent from the second computer over the network to the first computer, indicating that the first packet was not received. In response to the NAK packet, the first packet is retransmitted from the first computer to the second computer without retransmitting the second packet.

SUMMARY

Embodiments of the present invention that are described hereinbelow provide methods and apparatus that facilitate efficient RDMA data transfer.

There is therefore provided, in accordance with an embodiment of the invention, a method for data transfer, which includes transmitting a sequence of data packets, including at least a first packet and a second packet transmitted subsequently to the first packet, from a first computer over a network to a second computer in a single remote direct memory access (RDMA) data transfer transaction of a given type, selected from among first and second types of transactions. Upon receipt of the second packet at the second computer without previously having received the first packet, a negative acknowledgment (NAK) packet is sent from the second computer over the network to the first computer, indicating that the first packet was not received. A retransmission mode is selected responsively to the type of the transaction, such that when the transaction is of the first type, the first packet is retransmitted from the first computer to the second computer in response to the NAK packet without retransmitting the second packet, and when the transaction is of the second type, both the first and second packets are retransmitted from the first computer to the second computer in response to the NAK packet. In response to the NAK packet, one or more of the data packets are retransmitted from the first computer to the second computer in accordance with the selected retransmission mode.

In the disclosed embodiments, the transactions of the first type include RDMA Write and Read transactions, and the transactions of the second type include Send transactions. In one embodiment, the transactions of the second type further include RDMA Write with Immediate transactions. Additionally or alternatively, the transactions of the first type further include RDMA Atomic transactions.

In one embodiment, transmitting the sequence of the data packets includes, after retransmitting the first packet in the transaction of the first type, completing the RDMA data transfer transaction by transmitting at least a third packet subsequent to the second packet in the sequence from the first computer to the second computer.

Additionally or alternatively, retransmitting the one or more of the data packets includes, after retransmitting the first packet in the transaction of the second type, retransmitting all of the data packets in the sequence, including the second packet, that were transmitted following the first packet.

Typically, the NAK packet indicates a first packet serial number of the first packet. In a disclosed embodiment, retransmitting the one or more of the data packets includes retransmitting both the first packet and at least a third packet having a third packet serial number higher than the first packet serial number so as to cause the second computer to acknowledge receipt of the third packet.

In a disclosed embodiment, the first and second computers are connected to the network by respective first and second network interface controllers (NICs), and selecting the retransmission mode includes deciding which of the packets are to be retransmitted responsively to a capability of the second NIC to handle the data packets that are received out of order. Additionally or alternatively the method includes, when the transaction is of the second type, discarding the second packet that was received without previously having received the first packet, and writing the data from both the first and second packets to the memory of the second computer after receiving the retransmitted first and second packets.

There is also provided, in accordance with an embodiment of the invention, data transfer apparatus, including a first network interface controller (NIC), which couples a first computer to a network and is configured to transmit a sequence of data packets, including at least a first packet and a second packet transmitted subsequently to the first packet, from a first computer over a network to a second computer in a single remote direct memory access (RDMA) data transfer transaction of a given type, selected from among first and second types of transactions. A second NIC couples the second computer to the network and is configured to send, upon receipt of the second packet without previously having received the first packet, a negative acknowledgment (NAK) packet over the network to the first computer, indicating that the first packet was not received. The first NIC is configured to select a retransmission mode responsively to the type of the transaction, such that when the transaction is of the first type, the first NIC retransmits the first packet in response to the NAK packet without retransmitting the second packet, and when the transaction is of the second type, the first NIC retransmits both the first and second packets in response to the NAK packet, and to retransmit one or more of the data packets in response to the NAK packet in accordance with the selected retransmission mode.

The present invention will be more fully understood from the following detailed description of the embodiments thereof, taken together with the drawings in which:

DETAILED DESCRIPTION OF EMBODIMENTS

Overview

Figure 1:
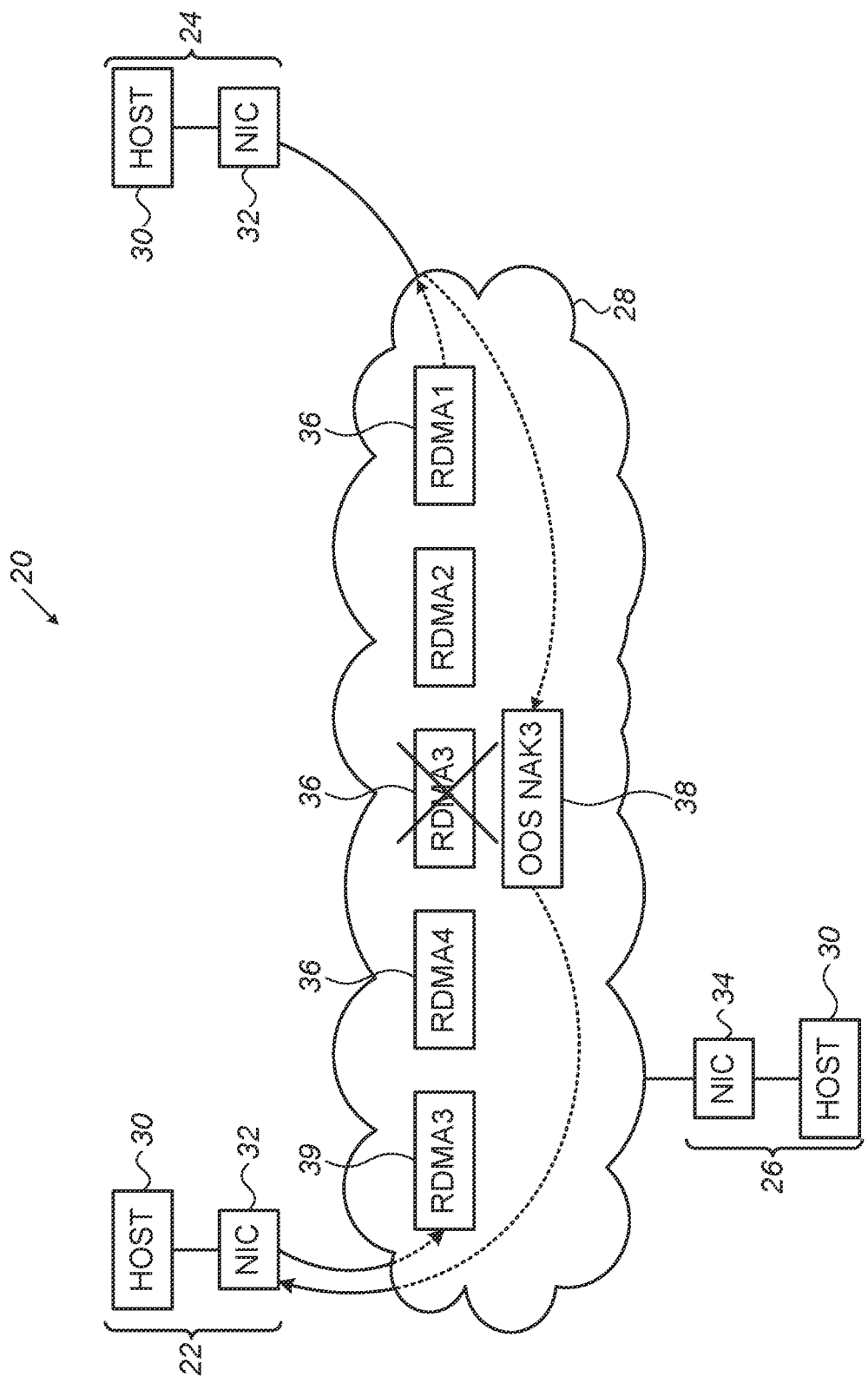
FIG. 1 is block diagram that schematically illustrates a computer system, in accordance with an embodiment of the invention.

Performance of RDMA transactions can be sensitive to packet loss, and RDMA protocols such as the IB and RoCE protocols were therefore designed to run over networks that are generally lossless. (Typically, link-level flow control is used to guarantee lossless transmission in both IB and Converged Ethernet networks.) For this reason, the mechanisms for acknowledgment of packet reception and for retransmission in case of data loss in these RDMA protocols are simple: Upon failure to receive a positive acknowledgment, the transmitter retransmits all packets starting immediately after the last packet that was acknowledged by the receiver. In other words, loss of a single packet can result in duplicate transmission of many subsequent packets. In lossless networks, this inefficiency is inconsequential, but when significant numbers of loss events occur, the RDMA retransmission approach can have a negative effect on performance.

Embodiments of the present invention that are described hereinbelow provide mechanisms for selective acknowledgment and retransmission of RDMA packets, which substantially reduce the number of packets that have to be retransmitted in case of packet loss. These mechanisms are implemented autonomously by NICs that couple the participating host computers to the network and carry out the transactions, so that the host processors and operating systems are not involved in or even aware of the retransmissions. The disclosed mechanisms reduce the load on the network due to retransmissions and enable more rapid recovery from packet loss.

Generally speaking, however, implementation of selective retransmission requires that the receiving NIC be capable of handling and buffering packets that it receives out of order (OOO): When a given packet in a multi-packet RDMA transaction is lost but subsequent packets are received, the NIC has to save the subsequent packets in memory (either the host memory or a dedicated buffer) while requesting and waiting for retransmission of the lost packet. When the retransmitted packet arrives, the NIC must load all the packets into the host memory in the proper order and notify the host processor that the transaction has been completed, for example by writing a completion queue element (CQE) to the host memory.

In RDMA Write transactions, the incoming packets indicate the address range in the host memory of the responder to which the packet data are to be written, and thus provide the receiving NIC with all the information that it needs to find the appropriate "slots" for the data in the host memory even when the packets arrive out of order. The NIC can use this information to write the data that it receives from packets that arrive out of order directly to the host memory, and can thus request retransmission only of the missing packet, and not the subsequent packets. Upon receiving the retransmitted packet, the NIC writes the data to the empty slot and writes a CQE to notify the host processor that the transaction is complete. RDMA Read response packets can be handled in similar fashion.

In processing data received in Send transactions, on the other hand, the address range to which the receiving NIC must write the packet data is indicated by WQEs posted by a responder application running on the local host processor. The receiving NIC reads and consumes the WQEs in order, and then writes a corresponding CQE to the host memory for each WQE that it consumes. For this reason, if the NIC is to handle Send packets received out of order, the NIC must generally maintain its own reordering buffer, from which it writes the packet data to host memory only after all the packets in the Send transaction have arrived. This approach is costly in terms of the logic and memory resources required of the NIC. RDMA Write with Immediate transactions suffer from similar difficulties.

Embodiments of the present invention address this problem by handling lost packets selectively, depending on the type of transaction. This selectivity is invoked when a sequence of data packets is sent in a given RDMA transaction from a transmitting computer over a network to a receiving computer, and the receiving computer receives a given packet in the sequence without first having received a certain preceding packet in the sequence. The receiving computer sends a NAK packet, but the retransmission mode following the NAK depends on the transaction type: For transactions of a first type, such as RMDA Write, RDMA Read and RDMA Atomic transactions, the missing (preceding) packet is retransmitted, without retransmitting the given packet and any subsequent packets that were already transmitted. On the other hand, for transactions of a second type, such as Send and RDMA Write with Immediate transactions, the missing packet and all subsequent packets in the transaction are retransmitted. Thus, packet loss in transactions of the first type can be handled with optimal efficiency, without burdening the receiving NIC with the difficulties of packet reordering in transactions of the second type.

System Description

FIG. 1 is block diagram that schematically illustrates a computer system 20, in which host computers 22, 24, 26 communicate via a packet network 28, in accordance with an embodiment of the invention. Each computer 22, 24, 26 comprises a host processing subsystem 30, comprising a host processor and memory, and is coupled to network 28 by a respective NIC 32 or 34. For purposes of the description that follows, NICs 32 are assumed to support full selective retransmission and packet reordering for all types of RDMA transactions, while NIC 34 provides selective retransmission support for some types of transactions (such as RDMA Write and Read), but not for others (such as Send transactions). In the present embodiment, network 28 is assumed to be an Ethernet network, over which NICs 32, 34 exchange data using the RoCE protocol, but the principles of the present invention are equally applicable to RDMA operations carried out over other types of networks and/or using other RDMA protocols.

NICs 32 and 34 may inform one another of their capabilities in terms of retransmission support, for example by means of suitable signaling packets exchanged between the NICs before RDMA transmission begins. As a result, in communication between NICs 32, selective retransmission will be applied to all RDMA transactions, meaning that only those packets that are actually lost will be retransmitted. On the other hand in communications between NICs 32 and NIC 34, selective retransmission is applied selectively, meaning that in some cases only the packets that are actually lost will be retransmitted, whereas in other cases the lost packet and all subsequent packets will be retransmitted, depending on the transaction type. System 20 may also comprise legacy NICs, which do not support selective retransmission at all, in which case lost packets and all subsequent packets are retransmitted irrespective of the transaction type.

In the example shown in FIG. 1, NIC 32 of computer 22 sends a sequence of data packets 36 over network 28 to NIC 32 of computer 24 in an RDMA data transfer transaction. The third packet 36 in the sequence, identified in the figures as "RDMA3," is lost in transit due, for example, to congestion encountered at a switch in network 28. Consequently, NIC 32 of computer 24 receives the next packet in the sequence, labeled "RDMA4," without having previously received RDMA3. (This same sort of eventuality may also occur when RDMA4 arrives at its destination before RDMA3 due to a routing delay, for example)

After receiving packet RDMA4 at computer 24 without previously having received RDMA3, NIC 32 of computer 24 sends an out-of-sequence (OOS) NAK packet 38 over network 28 to computer 22, indicating that it did not receive packet RDMA3. NIC 32 may send NAK packet 38 immediately upon receiving packet RDMA4, or it may wait until a certain timeout has elapsed. In this latter case, NAK packet 38 may identify multiple packets 36 in the sequence (including packet RDMA3) that were not received at computer 24. In either case, NIC 32 of computer 22 will respond by retransmitting a packet 39 that was indicated by NAK packet 38 as having been lost, without retransmitting packet RDMA4 or other packets that were not explicitly requested by NIC of computer 24. Additionally or alternatively, NAK packet 38 may identify both packet RDMA3 (and possibly other packets) as not having been received and packet RDMA4 (or another packet) as the last packet 36 in the sequence that was received at computer 24.

If the same transaction were carried out between computer 22 and 26, NIC 34 will likewise transmit OOS NAK packet 38 after failing to receive packet RDMA3. In the case of an RDMA Write transaction, NIC 32 of computer 22 will retransmit only packet RDMA3, as in the pictured example. On the other hand, in the case of a Send transaction, NIC 32 of computer 22 will go back in the transmission sequence to RDMA3, and will thus retransmit both RDMA3 and RDMA4. Scenarios of this sort are described in detail hereinbelow with reference to FIGS. 4 and 6.

Figure 2:
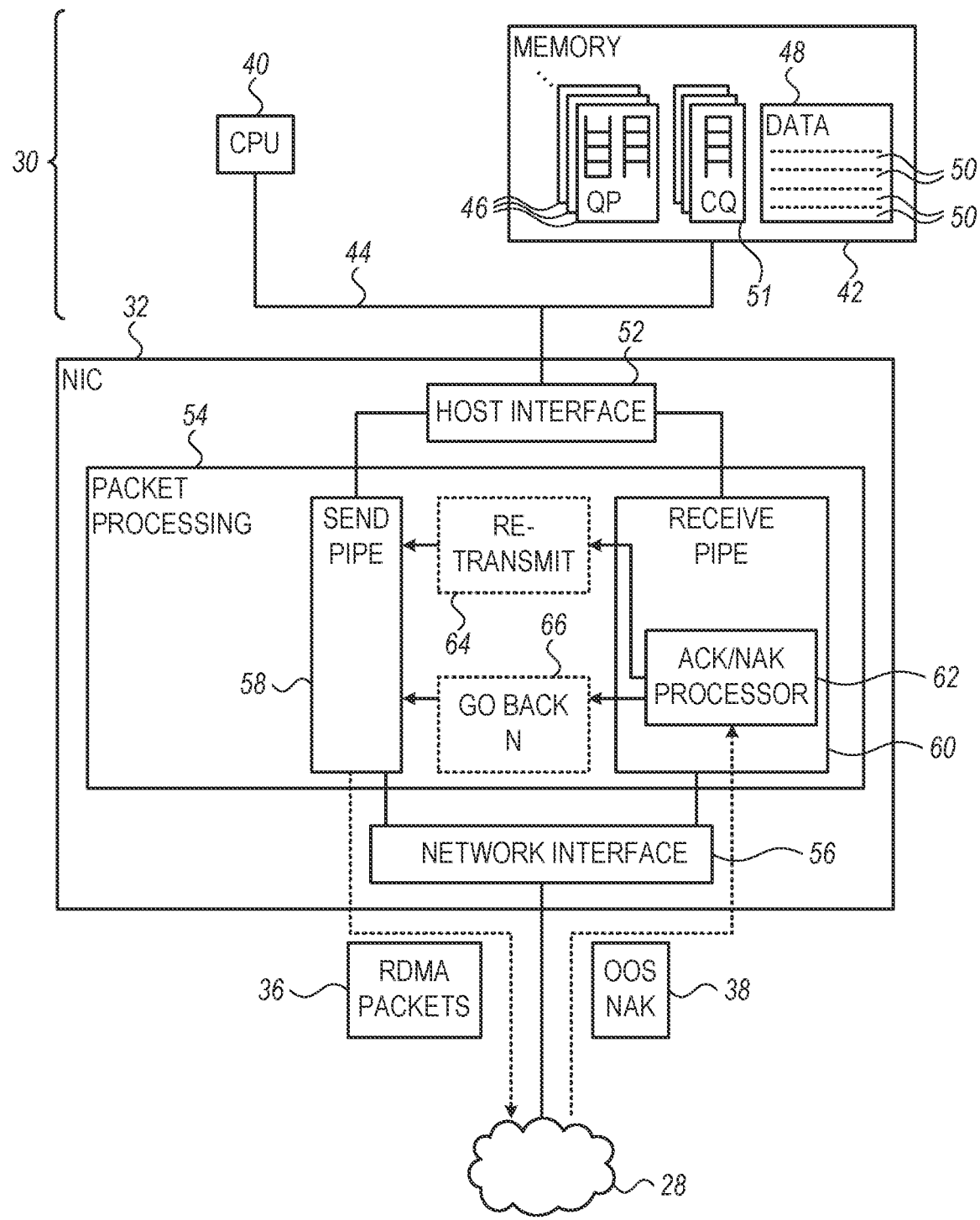
FIG. 2 is a block diagram that schematically shows details of a host computer with a network interface controller (NIC), in accordance with an embodiment of the invention.

FIG. 2 is a block diagram that schematically shows details of host computer 22, and particularly NIC 32, in accordance with an embodiment of the invention. Typically, host computers 24 and 26 and their respective NICs 32 and 34 are of similar structure and functionality to that shown in FIG. 2. Host computer 22 comprises a host processing subsystem 30, comprising a host processor 40, typically comprising at least one central processing unit (CPU), and a system memory 42, linked by a peripheral component bus 44, such as a PCI Express® (PCIe) bus, to NIC 32. Processes running in software on host processor 40 interact with NIC by submitting work requests to NIC driver software, which places corresponding work items, known as work queue elements (WQEs), into work queues 46 in memory 42. Typically, the work queues are arranged as queue pairs (QPs), each including a send queue and a receive queue.

To initiate an RDMA transaction, such as an RDMA Write or Read transaction or a Send transaction to or from computer 24 or computer 26, host processor 40 posts a WQE in the appropriate work queue 46 and notifies NIC 32 that the WQE is awaiting execution. The WQE identifies a data buffer 48 in memory 42 from which the RDMA data are to be read by NIC 32 for transmission to computer 24 or to which the data are to be written by NIC 32 upon receipt from computer 24. When the transaction involves a large amount of data, NIC 32 will carry out the transaction by sending or receiving multiple data packets, each with a respective segment 50 of the data in buffer 48 as its payload. Upon completion of the transaction, NIC 32 posts a CQE to a completion queue 51 in memory 42, to be conveyed to the appropriate software process on host processor 40.

NIC 32 comprises a host interface 52, which connects to bus 44, and a network interface 56, with one or more ports connecting to network 28. Packet processing logic 54, coupled between host interface 52 and network interface 56, reads and executes WQEs from work queues 46, typically by direct memory access (DMA) via bus 44. A send pipe 58 generates and transmits data packets via network interface to network 28 in accordance with the instructions provided by the WQEs. For example, in the case of an RDMA Write or Send request, send pipe 58 will generate one or a sequence of RDMA data packets 36, each containing its respective segment 50 of data, read by DMA from buffer 48.

A receive pipe 60 in packet processing logic 54 receives and processes data packets from network 28. In the case of incoming RDMA write or RDMA read response packets, receive pipe 60 will write the data segments contained in the packet payloads to the appropriate locations in buffer 48. When packets in a sequence are received out of order, receive pipe 60 can still write segments 50 to buffer 48 in the proper, ordered locations, but will refrain from reporting to host processor 40 that the transaction has been completed until all packets in the sequence have actually been received. (Techniques that can be used in this context for handling out-of-order RDMA packets and transactions are described, for example, in U.S. Pat. No. 10,110,518, whose disclosure is incorporated herein by reference.)

Receive pipe 60 tracks packet reception, and in particular verifies that sequences of packets received in RDMA data transfer transactions arrive in order. As long as the packets are received in order, an acknowledgment engine 62, in or associated with receive pipe 60, generates ACK packets identifying the last packet that was received, and instructs send pipe 58 to send these ACK packets to the transmitting computer. On the other hand, upon receipt of a packet with a given packet serial number (PSN) in an RDMA transaction without previously having received all of the packets in the transaction with preceding sequence numbers, acknowledgment engine 62 will recognize the occurrence of an OOS event. The acknowledgment engine will then instruct send pipe 58 to send a corresponding NAK packet 38 to the transmitting computer, identifying the missing packet or packets. Example scenarios of this sort are illustrated in the figures that follow.

When an incoming NAK packet 38 is received by network interface 56, acknowledgment engine 62 parses the NAK packet in order to identify the packet or packets that were lost in transmission to computer 24, and thus the corresponding segments 50 that will require retransmission. Acknowledgment engine 62 passes a retransmission instruction to send pipe 58, causing the send pipe to read the appropriate data from buffer 48 and retransmit the requested RDMA data packets 36. The type of retransmission instruction depends on the type of transaction and the reordering capabilities of the NIC that sent NAK packet 38: If only a specific lost packet is to be retransmitted, acknowledgment engine 62 passes a packet-selective retransmission instruction 64 to send pipe 58. If all packets beginning from the lost packet are to be retransmitted, acknowledgment engine 62 passes a "go-back-N" instruction 66, meaning that send pipe 58 should go back in the transaction to the lost packet and resume transmission of all packets in order from that point. In either case, once the receiving NIC receives the retransmitted packet or packets, the RDMA transaction can be completed.

Methods of Operation

Figure 3:
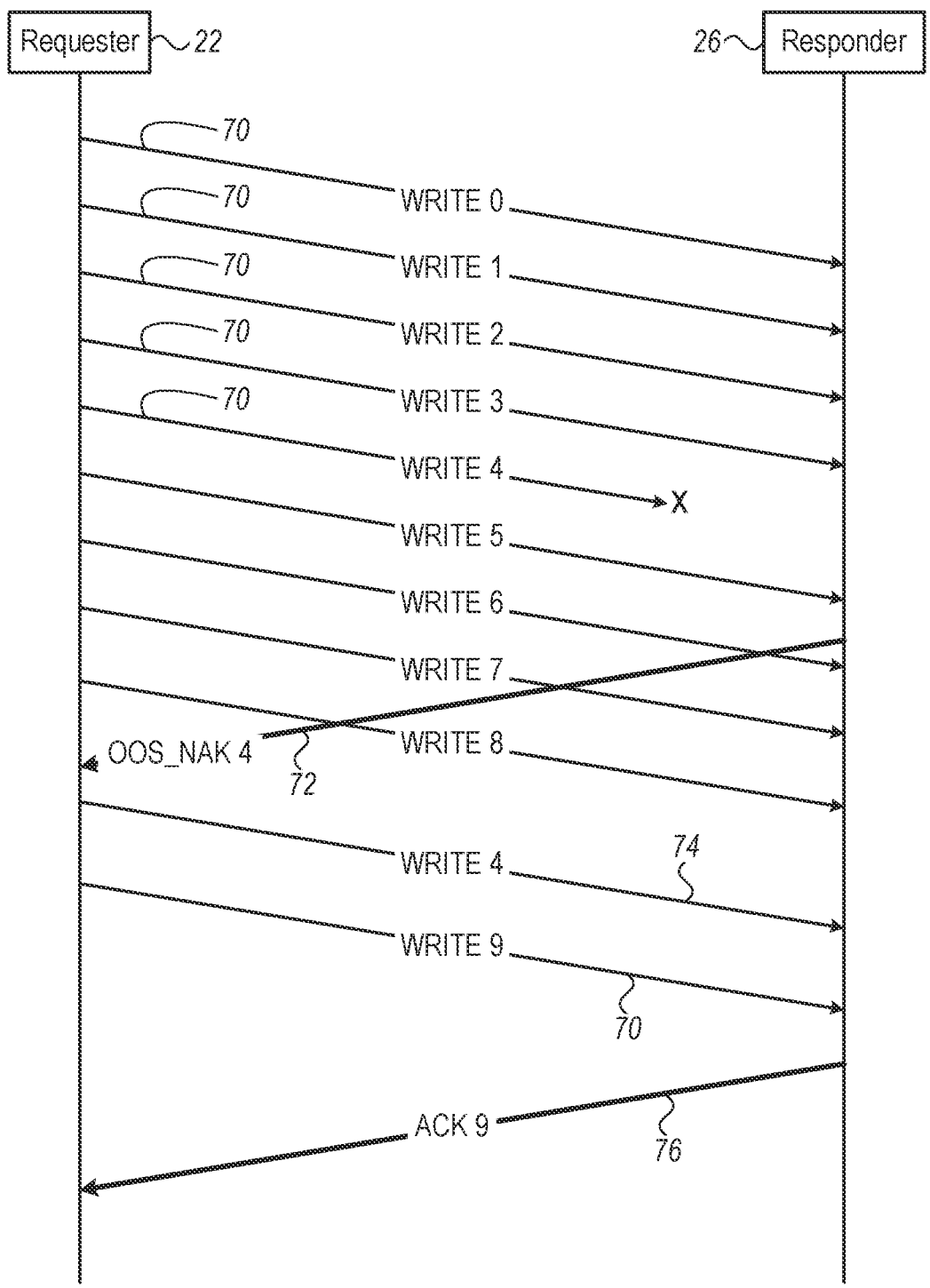
FIGS. 3-6 are ladder diagrams that schematically illustrate methods for selective acknowledgment and retransmission of RDMA packets, in accordance with embodiments of the invention.

FIG. 3 is a ladder diagram that schematically illustrates a method for selective acknowledgment and retransmission of RDMA Write packets, in accordance with an embodiment of the invention. In this description and in the figures that follow, for the sake of concreteness and clarity, computer 22 is assumed to be the requester, which transmits the RDMA data packets in the RDMA write operation, while computer 26 is the responder, which receives and acknowledges the packets (as in system 20, shown in FIG. 1). It is further assumed in the transactions illustrated in FIGS. 4 and 6 that NIC 34 of computer 26 supports selective retransmission of RDMA Write packets but not of Send packets. Alternatively, the roles of the two computers may be reversed, or other computers with suitably-configured NICs 32, 34 may be involved.

NIC 32 of computer 22 transmits RDMA Write packets 70 in the sequence that is shown in FIG. 3, but NIC 34 of computer 26 receives packet #5 before receiving packet #4 (which may arrive later or not at all). As NIC 32 of computer 22 is not yet aware that any packet failed to reach its destination in the proper sequence, NIC 32 continues transmission of RDMA Write packets following packet #4.

Upon receiving packet #5, NIC 34 of computer 26 sends a NAK packet 72 back to computer 22, indicating that packet #4 was not received. In the meanwhile, NIC 34 continues to receive the additional RDMA Write packets in the sequence and stores the data from these packets in memory 42 of computer 26. Upon receiving NAK packet 72, NIC 32 of computer 22 suspends transmission of further data packets, and responds to NAK packet 72 by generating and sending a retransmitted data packet 74. This retransmitted data packet is typically labeled with the same packet serial number (PSN) as the packet identified in NAK packet 72, i.e., #4 in the present example. Packet 74 is transmitted out of order, without retransmission of the subsequent RDMA Write packets (#6, #7 and #8 in this example) that were successfully received at computer 26.

After retransmitting data packet 74, NIC 32 of computer 22 completes the RDMA data transfer transaction by transmitting any further packets 70 remaining in the sequence subsequent to those already transmitted. NIC 32 need not wait for acknowledgment of retransmitted data packet 74 before resuming transmission, but rather continues transmitting packets 70 until the entire sequence has been transmitted and acknowledged. Thus, in the present example, NIC 32 of computer 22 continues by transmitting RDMA Write packet #9, which is the last packet in the sequence.

NIC 34 of computer 26 arranges the received packet data in memory 42, and returns a positive ACK packet 76 over network 28 to computer 22. ACK packet 76 typically identifies the most recent packet in the sequence that was successfully received at computer 26. Thus, in the present example, ACK packet 76 acknowledges data packet #9.

Figure 4:
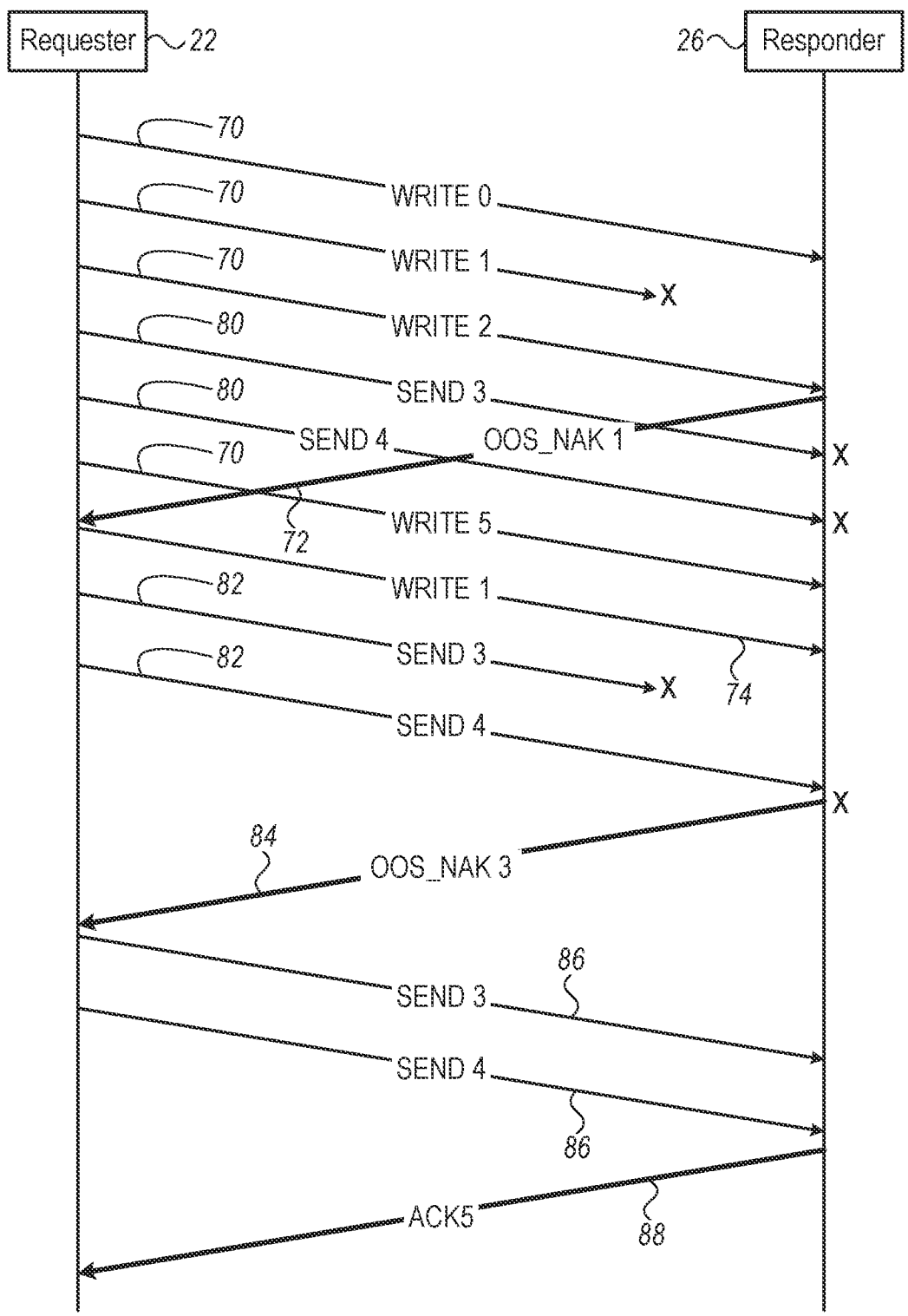

FIG. 4 is a ladder diagram that schematically illustrates a method for selective acknowledgment and retransmission of both RDMA Write and Send packets, in accordance with another embodiment of the invention. In this embodiment, NIC 32 of computer 22 transmits a sequence of RDMA Write packets 70, in an RDMA Write transaction, followed by a sequence of Send packets 80, in a Send transaction. The packets are numbered serially, for example by PSN, over the successive transactions. It is assumed that NIC 34 of computer 26 supports selective retransmission in RDMA Write transactions, but not in Send transactions, because of the difficulties in packet reordering that were explained above.

In the pictured scenario, RDMA Write packet #1 is lost in transmission. Upon receiving RDMA Write packet #2, NIC 34 of computer 26 returns NAK packet 72, reporting the loss of packet #1. In the meanwhile, computer 22 has begun the Send transaction, by transmitting Send packets #3 and #4, and then transmits a further RDMA Write packet #5 before receiving NAK packet 72. NIC 34 of computer 26 drops Send packets #3 and #4 (as indicated by the X marks in the right margin), since it does not support OOO processing of Send transactions.

After receiving NAK packet 72, NIC 32 of computer 22 retransmits RDMA Write packet #1 (retransmitted packet 74 in FIG. 4), but does not retransmit the subsequent RDMA Write packets. NIC 34 of computer 26 has informed NIC 32 that it does not support OOO reception and processing of Send transactions. Therefore, NIC 32 of computer 22 reinitiates the previous Send transaction by retransmitting Send packets 82, with their original serial numbers #3 and #4. This time, however, retransmitted Send packet #3 is lost, causing NIC 34 of computer 26 to drop the subsequent retransmitted Send packet #4 and return a further NAK packet 84 to computer 22 to report the loss of Send packet #3. In response, NIC 32 of computer 22 retransmits all packets 86 of the Send transaction, i.e., both packet #3 and packet #4.

Once NIC 34 of computer 26 has finally received retransmitted Send packets 86, it returns an ACK packet 88 to computer 22. ACK packet 88 indicates the serial number of the last RDMA packet in the sequence that was successfully received—in this case RDMA Write packet #5, having the highest PSN so far—even if it was not the most recently received.

Figure 5:
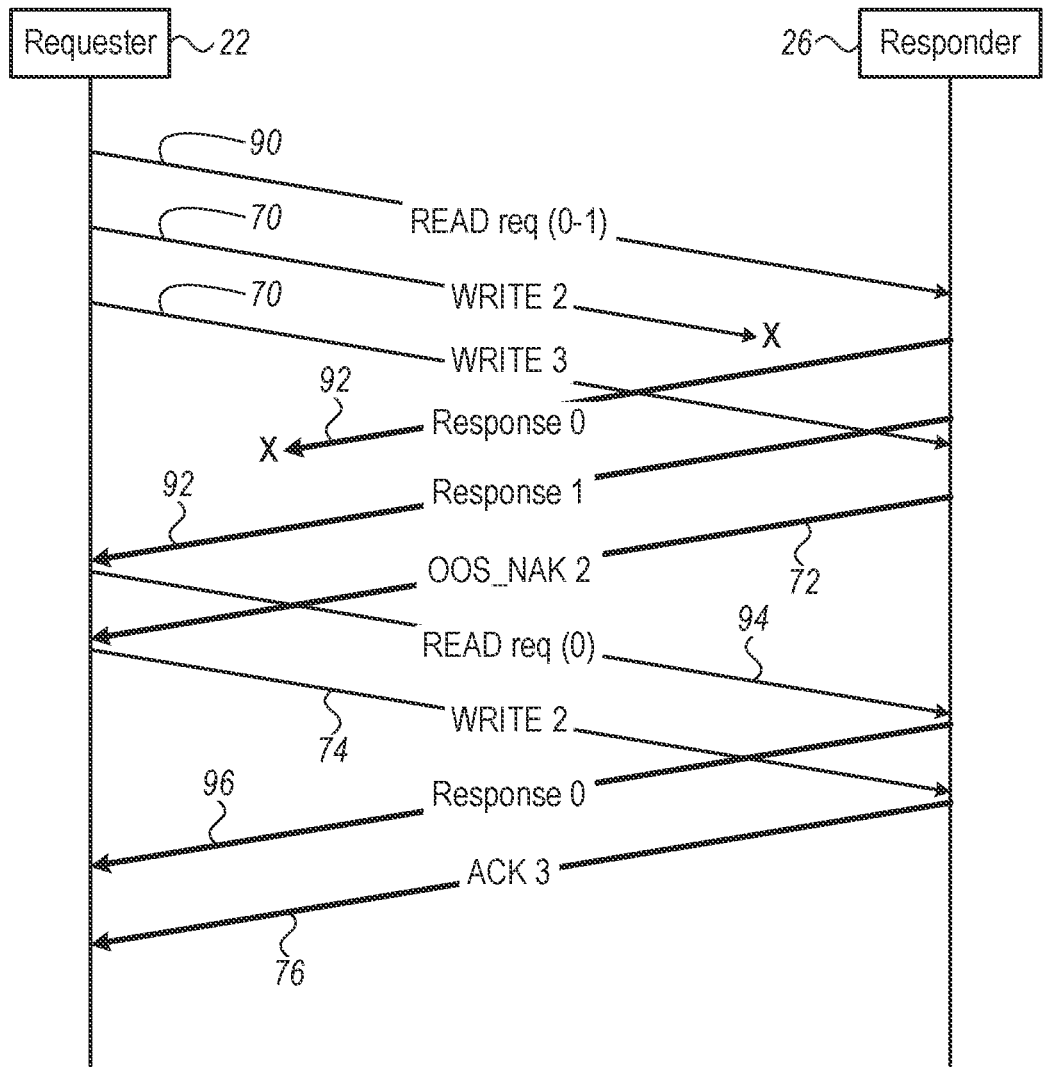

FIG. 5 is a ladder diagram that schematically illustrates a method for selective acknowledgment and retransmission of RDMA packets, in accordance with yet another embodiment of the invention. This embodiment illustrates the application of selective retransmission of both RDMA Write and RDMA Read packets. NIC 32 of computer 22 transmits an RDMA Read request packet 90 to computer 26, followed by an RDMA Write transaction includes RDMA Write packets #2 and #3. NIC 34 of computer 26 responds to RDMA Read request packet 90 by transmitting RDMA Read response packets 92, including packet #0 and packet #1. Both RDMA Write packet #2 and RDMA Read response packet #0 are lost in transit.

Upon receiving RDMA Write packet #3 without having received packet #2, NIC 34 of computer 26 transmit NAK packet 72, requesting retransmission of packet #2. In response, NIC 32 of computer 22 retransmits RDMA Write packet #2 (as retransmitted packet 74 in the diagram). Upon receiving packet 74, NIC 34 of computer 26 writes the packet data to the appropriate address in memory 42 of computer 26 and then sends ACK packet 76, acknowledging RDMA Write packet #3.

Concurrently with the RDMA Write transaction, upon receiving RDMA Read response packet #1 without having received packet #0, NIC 32 of computer 22 transmits a new RDMA Read request packet 94, this time asking only for transmission of RDMA Read response packet #0. Upon receiving packet 94, NIC 34 of computer 26 retransmits packet #0 as a retransmitted RDMA Read response packet 96. NIC 32 receives and arranges the RDMA Read data at the appropriate addresses in memory 42 of computer 22.

Figure 6:
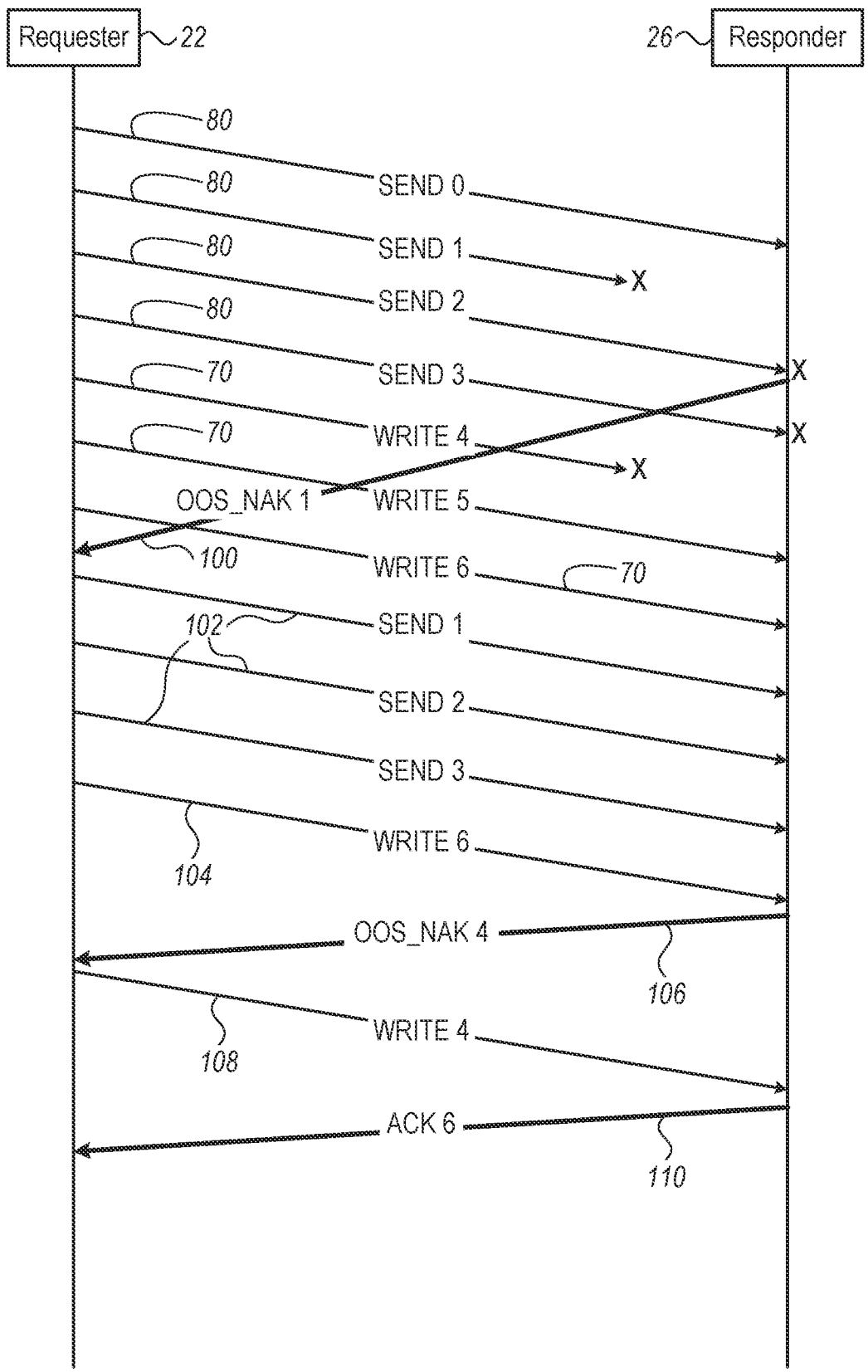

FIG. 6 is a ladder diagram that schematically illustrates a method for selective acknowledgment and retransmission of RDMA Write and Send packets, in accordance with a further embodiment of the invention. This embodiment addresses a problem of implementation that can arise when retransmission is handled differently in different types of RDMA transactions (such as RDMA Write and Send transactions): Because an OOS NAK in a Send transaction invokes retransmission of the lost packet and all subsequent packets in the transaction, the responder should wait to send any further OOS NAK packets until all the retransmitted packets have been received. Consequently, if another packet is lost in the interim in another, concurrent RDMA transaction, the responder will not be able to send another OOS NAK, nor will the responder be able to acknowledge successful completion of the other transaction. As a result of this deadlock, packet transmission from the requester to the responder can be stalled, typically until a lengthy timeout period has elapsed. Only then will the requester begin retransmitting packets for which it has not yet received an acknowledgment.

In the present embodiment, to avoid this sort of situation and the waste of transmission bandwidth that it entails, the requester, after completing retransmission of the sequence of Send packets, immediately retransmits a packet from the other, concurrent transaction (such as the RDMA Write transaction mentioned above) having a higher PSN than that of the retransmitted Send packets. Specifically, it is desirable that the requester retransmit the last packet in the other transaction. Upon receiving this retransmitted packet, the responder will either acknowledge all of the transmitted packets (typically with a single ACK packet indicating the highest PSN received) or will send an OOS NAK indicating the number of the earliest packet that was lost and has not yet been retransmitted.

Turning now to the example in FIG. 6, NIC 32 of computer 22 transmits Send packets 80 to computer 26. Send packet #1 is lost, causing NIC 34 of computer 26 to transmit a NAK packet 100 and to discard packets #2 and #3. Upon receiving NAK packet 100, NIC 32 of computer 22 retransmits Send packets 102, including the lost packet #1 and all subsequent packets in the transaction.

In the meanwhile, NIC 32 of computer 22 initiates an RDMA Write transaction, by transmitting RDMA Write packets 70. RDMA Write packet #4 is also lost in transit, but NIC 34 of computer 26 cannot send another OOS NAK packet as long as the previous NAK packet 100 is still in process. Therefore, to avoid the sort of deadlock explained above, after the last retransmitted Send packet 102 (packet #3) has been sent, NIC 32 of computer 22 retransmits an RDMA Write packet 104—in this case RDMA Write packet #6, which was the last packet in the transaction that was transmitted before NIC 32 began retransmission of Send packets 102.

Upon receiving retransmitted RDMA Write packet 104, NIC 34 of computer 26 can now transmit the next OOS NAK packet 106, indicating in this case that the previous RDMA Write packet #4 was lost. In response to NAK packet 106, NIC 32 of computer 22 retransmits an RDMA Write packet 108 corresponding to the lost packet #4. NIC 34 of computer 26 receives packet 108 and responds by transmitting an ACK packet 110, indicating the serial number of the last packet received in the RDMA Write transaction—in this case packet #6. Communications between computers 22 and 24 can now continue without further interruption.

Although the examples presented in the figures show certain specific scenarios for the purpose of illustrating certain features and principles of the present invention, these features and principles may similarly be implemented in other scenarios, involving different sorts of transactions and packet transmission patterns. For example, as noted above, RDMA Write with Immediate transactions may advantageously be handled in similar fashion to Send transactions. Alternatively, other divisions of RDMA transactions into types that use selective retransmission and other types that use multi-packet "go back N" retransmission may be implemented. All such alternative modes of transaction handling are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data transfer, comprising:
   transmitting a sequence of data packets, including at least a first packet and a second packet transmitted subsequently to the first packet, from a first computer over a network to a second computer in a single remote direct memory access (RDMA) data transfer transaction of a given type, selected from among first and second types of transactions,
   wherein in the first type of transaction, the first computer specifies a memory range to which data from the packets are to be written by the second computer, whereas in the second type of transaction, the memory range is specified by a work request submitted from a host processor to a network interface controller (NIC) of the second computer;
   upon receipt of the second packet at the second computer without previously having received the first packet, sending a negative acknowledgment (NAK) packet from the second computer over the network to the first computer, indicating that the first packet was not received;
   selecting a retransmission mode responsively to the type of the transaction, such that in response to the transaction being of the first type, the first packet is retransmitted from the first computer to the second computer in response to the NAK packet without retransmitting the second packet, and in response to the transaction being of the second type, both the first and second packets are retransmitted from the first computer to the second computer in response to the NAK packet; and
   in response to the NAK packet, retransmitting one or more of the data packets from the first computer to the second computer in accordance with the selected retransmission mode.

2. The method according to claim 1, wherein the transactions of the first type comprise RDMA Write and Read transactions, and the transactions of the second type comprise Send transactions.

3. The method according to claim 2, wherein the transactions of the second type further comprise RDMA Write with Immediate transactions.

4. The method according to claim 2, wherein the transactions of the first type further comprise RDMA Atomic transactions.

5. The method according to claim 1, wherein transmitting the sequence of the data packets comprises, after retransmitting the first packet in the transaction of the first type, completing the RDMA data transfer transaction by transmitting at least a third packet subsequent to the second packet in the sequence from the first computer to the second computer.

6. The method according to claim 1, wherein retransmitting the one or more of the data packets comprises, after retransmitting the first packet in the transaction of the second type, retransmitting all of the data packets in the sequence, including the second packet, that were transmitted following the first packet.

7. The method according to claim 1, wherein the NAK packet indicates a first packet serial number of the first packet, and wherein retransmitting the one or more of the data packets comprises retransmitting both the first packet and at least a third packet having a third packet serial number higher than the first packet serial number so as to cause the second computer to acknowledge receipt of the third packet.

8. The method according to claim 1, wherein the first and second computers are connected to the network by respective first and second network interface controllers (NICs), and wherein selecting the retransmission mode comprises deciding which of the packets are to be retransmitted responsively to a capability of the second NIC to handle the data packets that are received out of order.

9. The method according to claim 1, wherein the first and second computers are connected to the network by respective first and second network interface controllers (NICs), and wherein the method comprises:
   when the transaction is of the first type, writing data from the second packet to a memory of the second computer before receiving the retransmitted first packet; and
   when the transaction is of the second type, discarding the second packet that was received without previously having received the first packet, and writing the data from both the first and second packets to the memory of the second computer after receiving the retransmitted first and second packets.

10. Data transfer apparatus, comprising:
    a first network interface controller (NIC), which couples a first computer to a network and is configured to transmit a sequence of data packets, including at least a first packet and a second packet transmitted subsequently to the first packet, from a first computer over a network to a second computer in a single remote direct memory access (RDMA) data transfer transaction of a given type, selected from among first and second types of transactions,
    wherein in the first type of transaction, the first computer specifies a memory range to which data from the packets are to be written by the second computer, whereas in the second type of transaction, the memory range is specified by a work request submitted from a host processor to a network interface controller (NIC) of the second computer; and
    a second NIC, which couples the second computer to the network and is configured to send, upon receipt of the second packet without previously having received the first packet, a negative acknowledgment (NAK) packet over the network to the first computer, indicating that the first packet was not received,
    wherein the first NIC is configured to select a retransmission mode responsively to the type of the transaction, such that in response to the transaction being of the first type, the first NIC retransmits the first packet in response to the NAK packet without retransmitting the second packet, and in response to the transaction being of the second type, the first NIC retransmits both the first and second packets in response to the NAK packet, and to retransmit one or more of the data packets in response to the NAK packet in accordance with the selected retransmission mode.

11. The apparatus according to claim 10, wherein the transactions of the first type comprise RDMA Write and Read transactions, and the transactions of the second type comprise Send transactions.

12. The apparatus according to claim 11, wherein the transactions of the second type further comprise RDMA Write with Immediate transactions.

13. The apparatus according to claim 11, wherein the transactions of the first type further comprise RDMA Atomic transactions.

14. The apparatus according to claim 10, wherein the first NIC is configured, after retransmitting the first packet in the transaction of the first type, to complete the RDMA data transfer transaction by transmitting at least a third packet subsequent to the second packet in the sequence to the second computer.

15. The apparatus according to claim 10, wherein the first NIC is configured, after retransmitting the first packet in the transaction of the second type, to retransmit all of the data packets in the sequence, including the second packet, that were transmitted following the first packet.

16. The apparatus according to claim 10, wherein the NAK packet indicates a first packet serial number of the first packet, and wherein the first NIC is configured to retransmit both the first packet and at least a third packet having a third packet serial number higher than the first packet serial number so as to cause the second NIC to acknowledge receipt of the third packet.

17. The apparatus according to claim 10, wherein the first NIC is configured to select the retransmission mode responsively to a capability of the second NIC to handle the data packets that are received out of order.

18. The apparatus according to claim 10, wherein the second NIC is configured, when the transaction is of the first type, to write data from the second packet to a memory of the second computer before receiving the retransmitted first packet, and when the transaction is of the second type, to discard the second packet that was received without previously having received the first packet, and to write the data from both the first and second packets to the memory of the second computer after receiving the retransmitted first and second packets.

* * * * *